US00RE47869E

(19) United States
(12) Reissued Patent
Ianchulev et al.

(10) Patent Number: US RE47,869 E
(45) Date of Reissued Patent: Feb. 25, 2020

(54) SYSTEM AND METHOD FOR ADHESIVE APPLICATION OF A CUSTOMIZED SOLE-SHAPED PAD

(71) Applicants: Tsontcho Ianchulev, San Mateo, CA (US); Edward Y. Koo, Hillsborough, CA (US)

(72) Inventors: Tsontcho Ianchulev, San Mateo, CA (US); Edward Y. Koo, Hillsborough, CA (US)

(21) Appl. No.: 15/843,947

(22) Filed: Dec. 15, 2017

Related U.S. Patent Documents

Reissue of:
(64) Patent No.: 9,210,968
Issued: Dec. 15, 2015
Appl. No.: 13/834,584
Filed: Mar. 15, 2013

(51) Int. Cl.
*A43D 25/00* (2006.01)
*A43D 25/06* (2006.01)
*A43D 25/18* (2006.01)

(52) U.S. Cl.
CPC ..... *A43D 25/06* (2013.01); *A43D 25/185* (2013.01); *A43D 25/188* (2013.01)

(58) Field of Classification Search
None
See application file for complete search history.

(56) References Cited

U.S. PATENT DOCUMENTS 1,980,621 A 11/1934 Innis
2,371,689 A * 3/1945 John et al. ..... 36/30 R
2,538,580 A 1/1951 Meaker
2,943,403 A 7/1960 Meister
2,985,970 A 5/1961 McCarthy
3,300,275 A 1/1967 Lorman
3,578,738 A 5/1971 Hughes
3,634,954 A 1/1972 Larsen et al.
3,696,459 A 10/1972 Kucera et al.
3,775,793 A 12/1973 Casavant et al.
3,903,620 A * 9/1975 Gillet ..... 36/25 R
4,335,527 A 6/1982 Pask
4,454,618 A 6/1984 Curchod
4,517,696 A 5/1985 Schartz
4,926,568 A * 5/1990 Coffman ..... 36/15
5,640,779 A 6/1997 Rolloff et al.
5,694,704 A 12/1997 Kasbrick
5,771,605 A * 6/1998 Safdie ..... 36/25 R
5,858,155 A 1/1999 Hill et al.
5,907,881 A * 6/1999 Safdie ..... 12/142 R
6,146,588 A 11/2000 Deighton
6,532,686 B2 3/2003 Gultekin et al.
6,543,075 B2 4/2003 Gultekin et al.
6,584,704 B2 7/2003 March
(Continued)

FOREIGN PATENT DOCUMENTS

EP 479254 10/1991

*Primary Examiner* — Glenn K Dawson

(57) ABSTRACT

Systems, methods, and computer-readable storage media for applying an adhesive film to the sole of shoes. Application of a portion of the adhesive film can be performed by receiving a shoe on top of the adhesive film, which in turn is above a plate and compressible pins. Upon receiving the shoe, the plate is raised or lowered, and the compressible pins mark the perimeter of the sole of the shoe. The adhesive film is cut in a sole-shaped pattern due to the height differentiation, resulting in a sole-shaped portion of the adhesive film being adhered to the sole of the shoe.

21 Claims, 11 Drawing Sheets

(56) References Cited

U.S. PATENT DOCUMENTS 6,640,465 B1 * 11/2003 Burgess ..... 36/15
6,654,705 B1 11/2003 Benson et al.
6,684,442 B1 2/2004 Parker et al.
6,886,210 B2 5/2005 Dean
7,108,154 B1 9/2006 Thompson
D543,318 S 5/2007 Bohnen et al.
D556,990 S * 12/2007 Cabados ..... D2/961
7,377,054 B2 * 5/2008 Milner et al. ..... A43B 1/0045 36/11.5
7,559,159 B1 7/2009 Lundberg ..... A43B 3/163 36/7.1 R
7,614,138 B2 11/2009 Asici et al.
7,847,143 B2 12/2010 Moramarco et al.
8,024,872 B2 * 9/2011 Pettis ..... 36/73
8,171,661 B2 5/2012 Flynn et al.
8,186,548 B2 5/2012 Levine et al.
8,276,545 B2 10/2012 Greeson
9,210,968 B2 * 12/2015 Ianchulev ..... A43D 25/06
9,215,910 B2 * 12/2015 Dhillon ..... A43D 11/003
2004/0237165 A1 * 12/2004 Holden ..... A41D 13/06 2/69
2004/0244337 A1 12/2004 Asici et al.
2005/0034255 A1 2/2005 Svendsen
2005/0249791 A1 11/2005 Hobbs et al.
2005/0274042 A1 * 12/2005 Issler ..... 36/15
2006/0037214 A1 2/2006 Goggin-Lewis
2006/0112591 A1 * 6/2006 Lombardo ..... A41B 11/008 36/7.5
2006/0207123 A1 * 9/2006 Milner ..... A43B 1/0045 36/44
2006/0265903 A1 * 11/2006 Strong ..... A43B 3/106 36/25 R
2007/0098981 A1 * 5/2007 Guffey ..... B32B 7/12 428/352
2007/0119723 A1 5/2007 Smith
2008/0000498 A1 1/2008 Lestage et al.
2008/0301976 A1 * 12/2008 Li ..... 36/73
2010/0288800 A1 11/2010 Xu
2010/0296970 A1 11/2010 Trimarco et al.
2011/0023330 A1 2/2011 McBride
2012/0181447 A1 7/2012 Yerby
2012/0311887 A1 * 12/2012 Wong ..... 36/28
2014/0048214 A1 * 2/2014 Dhillon ..... A43D 11/003 156/760
2014/0259459 A1 * 9/2014 Ianchulev et al. ..... A43D 25/06 12/18.1

* cited by examiner

SYSTEM AND METHOD FOR ADHESIVE APPLICATION OF A CUSTOMIZED SOLE-SHAPED PAD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

The present disclosure relates to shoe pads and more specifically to a system and method for adhering a customized sole-shaped pad to the sole of a shoe to prevent floor contamination.

2. Introduction

Doormats serve to remove soil and contaminants from shoes as people enter homes, offices, or specific rooms. Typically a person will stand on the doormat or will move their feet over the doormat to brush dirt off. Standard doormats and floormats offer a time-efficient solution for removing some of the dirt and other contaminants off of shoes, but often fail to prevent tracking of dirt into the home or office. Other solutions for preventing the unintended distribution of dirt include tacky mats and shoe envelopment. For example, in the case of professional basketball, the players step onto a tacky mat specifically designed to remove particles which may result in a player sliding or slipping on the basketball court. Clean room solutions prevent any contamination or tracking of dirt by enveloping the shoe in a protective galosh or "bootie." Covering of the shoe, while appropriate for certain circumstances, is an undesirable solution for most homes and offices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for adhesive application of a customized sole-shaped pad to a shoe. As an example, a system configured per this disclosure can be an advanced doormat which receives an input signal indicating user readiness to adhere shoe pads to the soles of the user's shoes. The input signal can be obtained via a voice command, a motion sensor (including laser, infrared, radio frequency, ultrasound, and other formats), a spoken command, a manual button on the system, or other appropriate input means. The system moves an adhesive film, or material, which can have micro-perforations into position over a set of pins. The user steps onto the adhesive film. As the user steps onto the adhesive film, the portion of the adhesive film directly below the sole of the shoe adheres to the shoe. The adhesive film can have a balance of physical characteristics where the force required to vertically shear the film is greater than the force to perform lateral tearing. The pins directly below the sole of the shoe lower or compress due to the weight of the user and the shoe.

The resulting height differential between the portion adhered to the sole of the shoe (e.g., lowered due to the weight of the user or raised via springs and/or motorization) and the remaining adhesive film (at the original height, supported by the remaining pins) causes a shearing of the micro-perforations in a shape corresponding to the contour of the user's shoe. As the user steps off of the doormat, i.e., steps off of the adhesive film, the sheared portion remains adhered to the shoe, preventing tracking of future dirt or other contaminants. After the user steps off of the advanced doormat, what remains is a section of adhesive film with two sole-shaped holes corresponding to the sheared portions. The system collects the remainder of the adhesive film using a roller system or some other mechanism which causes a rotation or movement of the adhesive film such that a fresh portion of the adhesive film is positioned over the pins in preparation for another user stepping onto the doormat. The user can then walk away with the soles of their shoes covered with adhesive film. After use, the balance of physical characteristics of the film allows the user to remove the entire sole-shaped piece of adhered film from their shoes in a single pull, rather than having the adhered portion fragment upon being pulled.

DETAILED DESCRIPTION

A system, method and computer-readable media are disclosed which apply a customized sole-shaped pad to footwear, such as a shoe or sandal. Throughout this disclosure references to a shoe, sandal, or other footwear, are interchangeable. Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts as disclosed herein. A doormat as disclosed herein can be controlled by components of a computing device and therefore a general computing device is discussed. A more detailed description of adhering a customizable sole-shaped pad to a shoe will then follow with accompanying variations. These variations shall be described herein as the various embodiments are set forth. The disclosure now turns to FIG. 1.

Figure 1:
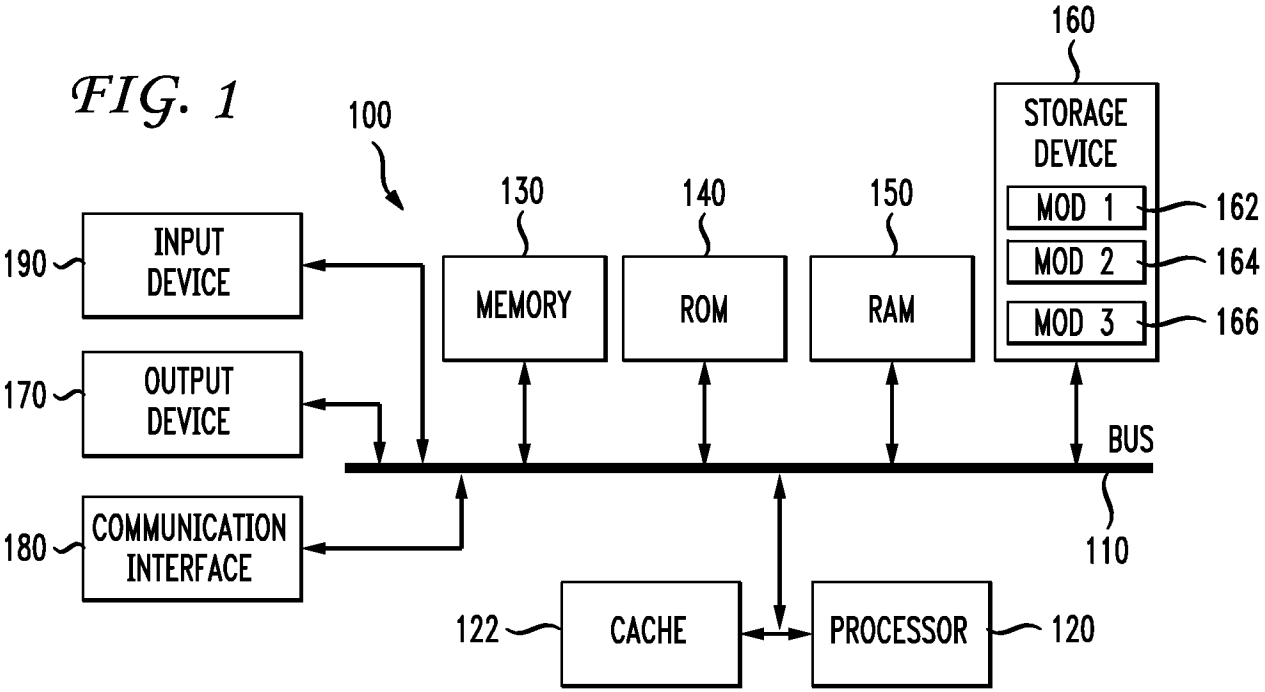
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
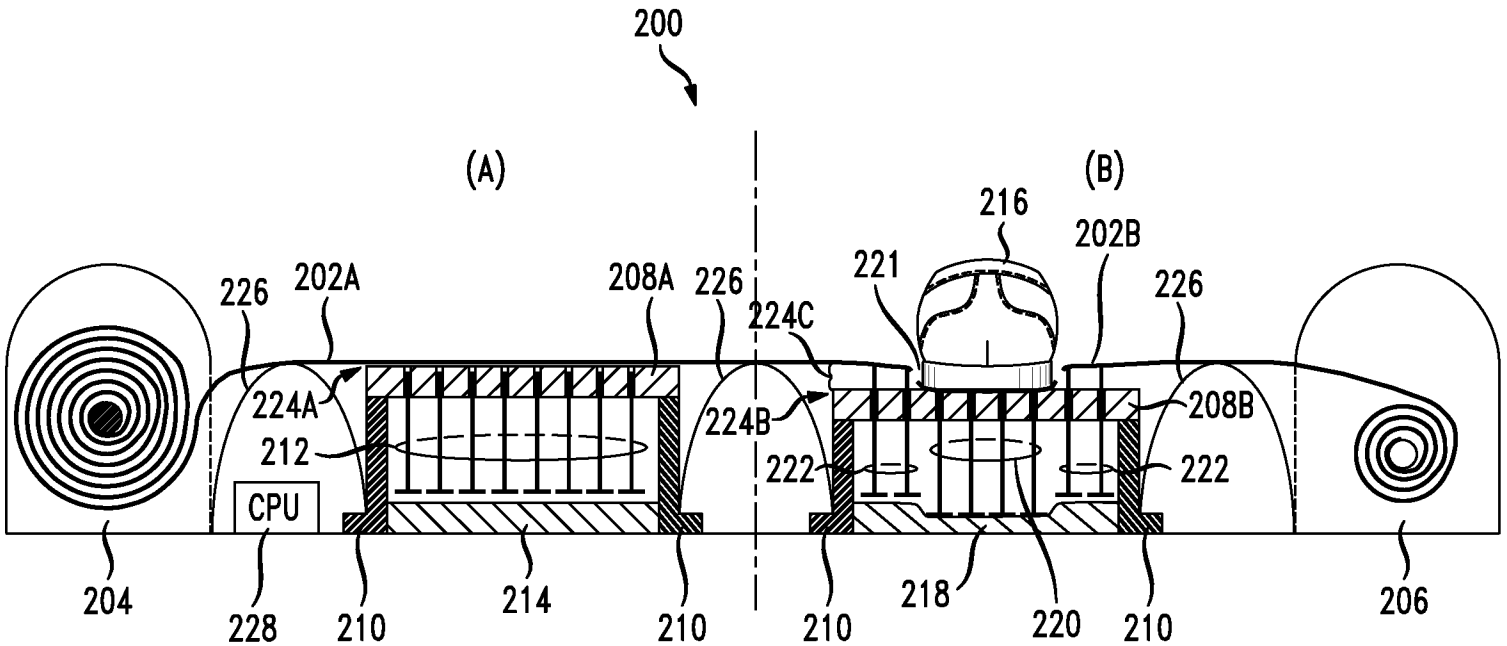
FIG. 2 illustrates a first example device embodiment.

Having disclosed some components of a computing system, the disclosure now turns to FIG. 2, which illustrates a first example device embodiment 200. FIG. 2 illustrates a cross section of the device 200 with the left side (A) empty and the right side (B) having a shoe thereon. These areas represent shoe receiving areas. The device 200 has unused adhesive film 204 which can stored in a roll. The unused adhesive film 204 and the used adhesive film collection roll 206 can be distributed as a replaceable cartridge, described below in FIG. 11. Other configurations can place the unused adhesive film 204 into separate sheets of adhesive film. At a particular time, such as after a user leaves the doormat or detecting that a user is approaching the doormat, the device 200 spools unused adhesive film 204 into a fixed position over a combination of plates 208A, 208B and pins 214, 220, 222. In the fixed position, a portion of the adhesive film 202A is positioned above, near, or in contact with plate 208A. The adhesive film 202A is held just above pins 212 and/or plate 208A at an original height 224A by material elevators 226, thereby preventing potential snags and inadvertent tearing. Exemplary heights at which the material elevators 226 can maintain the adhesive film 202A above the plate 208A include ⅛", ¼", ½", or other selected height.

The pins 212 associated with the plate 208A extend through the plate 208A using aligned holes to the initial height 224A, and are capable of being compressed using springs, hydraulics, underlying resistance elements or other mechanisms. An example of the pins 212 and plate 208A mechanism is provided by Benson et al., U.S. Pat. No. 6,654,705, issued Nov. 25, 2003, which is hereby incorporated in its entirety. As described and illustrated by Benson et al., the pins can be used to define the perimeter of a user's foot, or shoe, by placing the user's shoe onto the plate/pins device. In addition to the perimeter of the shoe, the plate/pins combination disclosed by Benson et al. can also be used to measure the vertical contours of the sole itself.

Below the pins, the device 200 can have a layer of elastomeric material 214 which can cushion the pins 212. On either side of the plate 208, pistons 210, or mechanical elevators, help raise and lower the plate 208A before and after use. The pistons 210 can be hydraulic, mechanical (such as a screw mechanism), springs, or any acceptable raising and lowering mechanism, and can operate automatically or based on instructions from a processor or computing device 228. In circumstances where the person is not standing on the doormat 200, the pistons maintain the plate 208A at a specified height 224A, just below the adhesive film 202A. Operations of the device 200 can be initiated via processor 228, as described by the system 100 of FIG. 1, and/or mechanically driven. If operated by a processor 228, instructions are communicated from the processor 228 to device 200 components by bus or other communication paths. The device 200 can use motors and sensors throughout the device 200 to detect locations of components, materials, and users, as well as current states of motion and action. These motors and sensors can interact with the processor 228 as a device control system, transmitting and receiving data at various parts of the device 200 throughout use. For example, sensors can indicate to the processor 228 when a user has stepped onto the device 200, or when a pin 212 is compressed, or when the plate 208A is no longer at the original height 224A. In addition, the processor 228 can instruct the plate 208A to raise or lower as needed by controlling the pistons 210.

The processor 228, or a control system, can further control any additional hydraulics or tension systems located in the device 200. For example, if a known user approaches the device 200, the tension in the pins 214 can be adjusted based on the weight of the known user. Alternatively, the initial height or tension 224A of the plate 208A and/or pins 212 may be adjusted based on time of day, temperature, weather conditions, or frequency of device use. Any number of adjustments and control decisions can be determined by the processor 228 based on specific input or via a user interface, such as a graphical user interface, a keyboard, a keypad, a microphone, optical scanner, or other input means.

Prior to receiving a shoe 216, and in preparation for receiving contact with a shoe, in accordance with the principles disclosed herein, the device 200 will spool a portion of unused adhesive film 204 into a fixed position. To initiate spooling, users can provide specific input or the system can spool based on a number of factors. For example, after a person leaves the doormat, the system can immediately, or after a predetermined period of time (e.g., like 10 seconds), initiate spooling to position fresh unused adhesive film 204. However, having unused adhesive film in position for too long may result in dust, grass, or other debris being blown on or settling on the adhesive film 204 thus reducing its effectiveness. Thus, in one aspect, the system will, via motion detection, sound detection or any other known mechanism, detect when a person is approaching the doormat and then spool the adhesive film 204. Where specific input is used, the specific input can include input provided by motion detection of a user, a voice command, a radio frequency identification, or input provided by a user manually pressing a button indicating that the user is in position to use the device 200. The spooling can be triggered by a location based service in which the system received a communication that a particular user's smartphone is approaching the doormat. Thus, existing location-based technology can result in an identification of a person in general or a particular person and the doormat can be adjusted and configured to improve the application of the adhesive to that person's shoes.

Alternatively, spooling can occur in the absence of any specific input, or after a time period of receiving no input. In certain embodiments, the user stepping onto the device 200 can compress a spring or other mechanism which, when the user steps off of the device 200 and releases the tension of the spring, spools the adhesive film. Upon spooling the adhesive film 202A into the fixed position, the device 200 is prepared to allow a user to step onto the adhesive film 202A with both feet.

Portion (B) represents when a user has stepped onto the device 200, placing their foot, having a shoe 216 thereon, onto the adhesive film 202A. When the user steps onto the device 200, placing the shoe into a shoe receiving area, multiple components of the device 200 can interact simultaneously or in direct succession. For example, upon receiving the shoe 216, the adhesive film 221 immediately below the sole of the shoe 216 adheres to the sole. The plate 208B beneath the user's shoe 216 lowers from the original height 224A to height 224B, resulting in a height differential 224C. The pins 220 directly beneath the sole of the shoe 216 are compressed to height 224B, and any elastomeric material 218 beneath the sole of the shoe 216 may be similarly compressed. The compression can occur based on the weight of the user and/or shoe, or based on instructions from the computer processor 228.

While the pins 220 directly below the sole of the shoe 216 compress to height 224B upon receiving the shoe, the remaining pins 222 pass through the lowered plate 208B, remaining at the original film height 224A. The remainder pins 222 hold the remainder portion of the adhesive film 202B (i.e., the film not immediate below the sole of the shoe) at the original film height 224A. The resulting height difference 224C between the portion of the film attached to the sole 221 and the remainder portion 202B of the film results in a tearing, or shearing, of the remainder portion 202B in a pattern matching the sole of the shoe 216. This tearing, or shearing, can be due to the vertical adhesive force of the adhesive film attached to the shoe 221 exceeding the lateral adhesive force of the adhesive film 202B not attached to the shoe. Micro-perforations throughout the adhesive film 202 can aid the tearing/shearing action.

After the adhesion of the film to the shoe, the user steps off the doormat 200. At this point the soles of the user's shoes have adhesive film 221 attached. When the user has stepped onto the doormat 200 with both feet, the remaining adhesive film 202B has two large holes corresponding to the portions attached to the user's shoes. The device 200 can then spool the used adhesive film 202B into a waste bin 206. The removal of the used adhesive film 202B can occur immediately, or can occur upon receiving additional input indicating a user is preparing to use the device 200.

In practice, occasions may dictate that a user could place one shoe at a time into the device 200, or could place both shoes in the device simultaneously. Should the user place only a single shoe in the device 200, the device can detect, by means of sensors associated with the plate 208, the mechanical elevators, the pins 212, or the elastomeric material 214, that one side of the device 200 has not yet been used. The device 200 can determine, based on the sensor feedback, that only one side of the adhesive film has perforations. When such a determination is made, the control system can instruct the spooling mechanism to only distribute a portion a portion of the normal distribution size of adhesive film 202A. For example, if a normal distribution of adhesive film has a width of 20" for both feet, upon detecting use of only a single foot the device 200 can distribute adhesive film having a width of 10". This prevents an unused portion of the adhesive film 202A from being wasted by erroneously directing the adhesive film 202A to waste collection 206.

Figure 3:
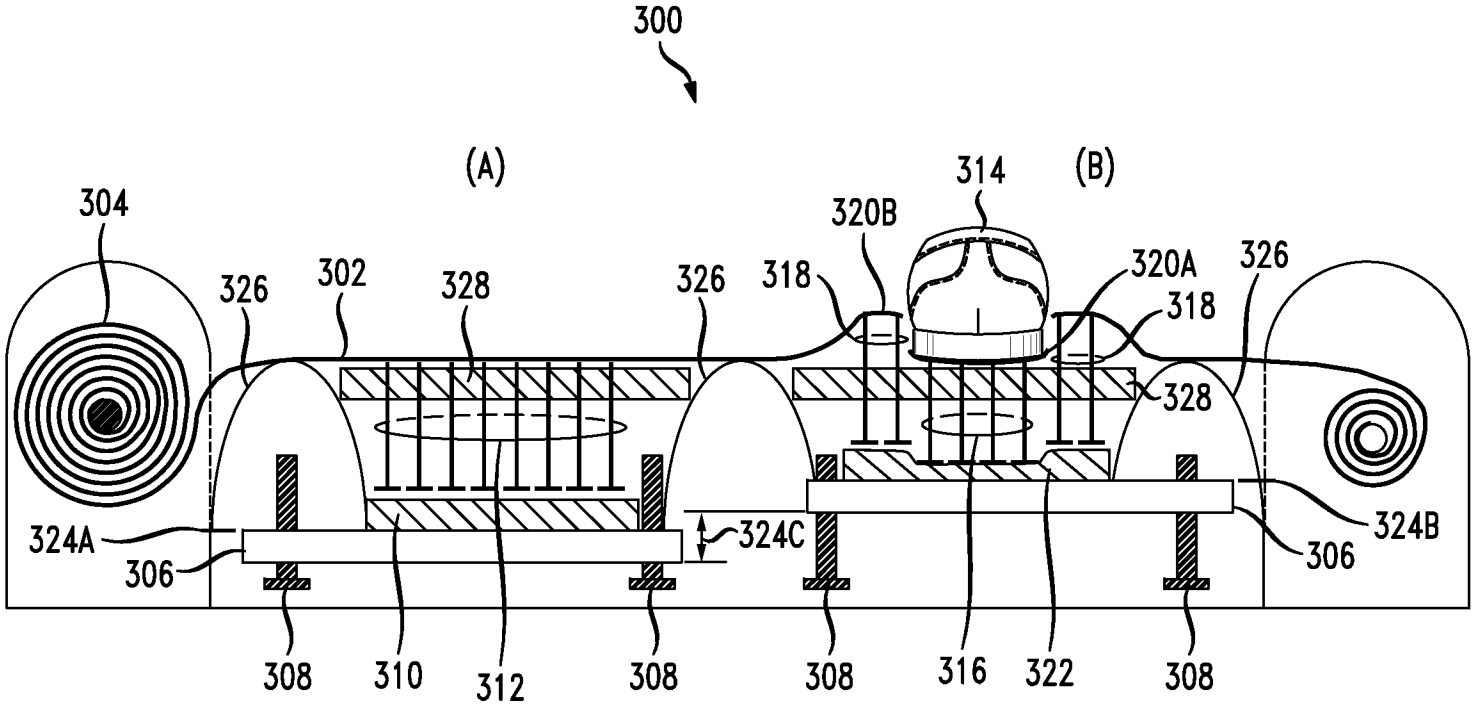
FIG. 3 illustrates a second example device embodiment.

FIG. 3 illustrates a second example device embodiment 300. As with FIG. 2, the left side (A) illustrates the device 300 empty, while the right side (B) illustrates the device in use. As in FIG. 2, a roll of unused adhesive film 304 is stored, later put into position when signals indicate that a user is in position to use the device 300. When in position, the adhesive film 302 rests at a first height 320A, just above a stationary plate 328 and pins 312 on material elevators 326. The material elevators 326 prevent the adhesive film 302 from getting snagged on stationary plate 328 and/or pins 312 during spooling. The pins 312 can rest on an elastomeric material 310, which in turn rests on an elevator 306, or the pins 312 can rest directly on the elevator 306. The elevator 306 is attached to mechanical pistons 308 which can raise and lower the elevator 306 during use.

When a user places a shoe 314 or shoes into the device 300, the adhesive material 302 between the shoe 314 and the stationary plate 328 is adhered to the shoe. Additionally, the elevator 306 is raised from an original height 324A to a raised height 324B by the pistons 308, a difference of 324C. In raising the elevator 306, the elastomeric material 322 and the pins 316 on the elevator 306 are also raised. This results in compression of pins 316 directly beneath the sole 314 of the shoe and/or compression of the elastomeric material 322. Pins on the elevator 306, but not directly beneath the sole 314 of the shoe (i.e., the remainder pins 318) are not compressed between the elevator 306 and the shoe 314. Instead, the remainder pins 318 are raised up with the raising of the elevator 306, and extend through the stationary plate 328. The remainder pins 318 lift the portion of the adhesive film 320B not directly beneath the shoe 314.

Because of the difference in height between the adhered portion 320A and the remainder portion 320B, the adhesive film 302 tears or shears in a shape corresponding to the shape of the shoe's sole. As the user removes the shoes from the device 300, the shoes have the adhered portion 320A attached to the soles. The remainder portion 320B has two holes in the adhesive film 302 where the portions corresponding to the adhered portions 320A were once located. The remainder 320B is later discarded and/or collected. The device 300 then instructions the pistons 308 to return the elevator 306 to the original height. In addition, the compressed pins 316 can return to an uncompressed state. In alternative embodiments, the device 300 can contain multiple elevators, rather than two as illustrated. In yet other embodiments, the device 300 can contain a single elevator for both the left and right feet, rather than separate elevators as illustrated.

The elevators 306 are illustrated as a raising or lowering the entirety of the pins 316 simultaneously. In other variations of the elevators 306, a roller elevator or mechanism can be used to push/compress the pins upward as the roller passes beneath the user's feet. A roller (or rolling) elevator is not illustrated in FIG. 3. However, a roller elevator would serve the same function as the illustrated elevators 306. For example, the user places the shoe on the device 300 with a roller elevator initially located near the user's toes. Upon detecting the user's shoe, the roller elevator rolls beneath the user's shoe from the toes toward the user's heel. As the roller elevator rolls toward the heel the pins beneath the foot are raised when the roller elevator passes beneath them, resulting in raised pins 316. Therefore, in this embodiment, the entirety of the pins 316 are not raised simultaneously, but in sequence as the roller moves from toe to heel. In other configurations, the roller elevator can initiate at the heel or can make multiple passes.

Figure 4:
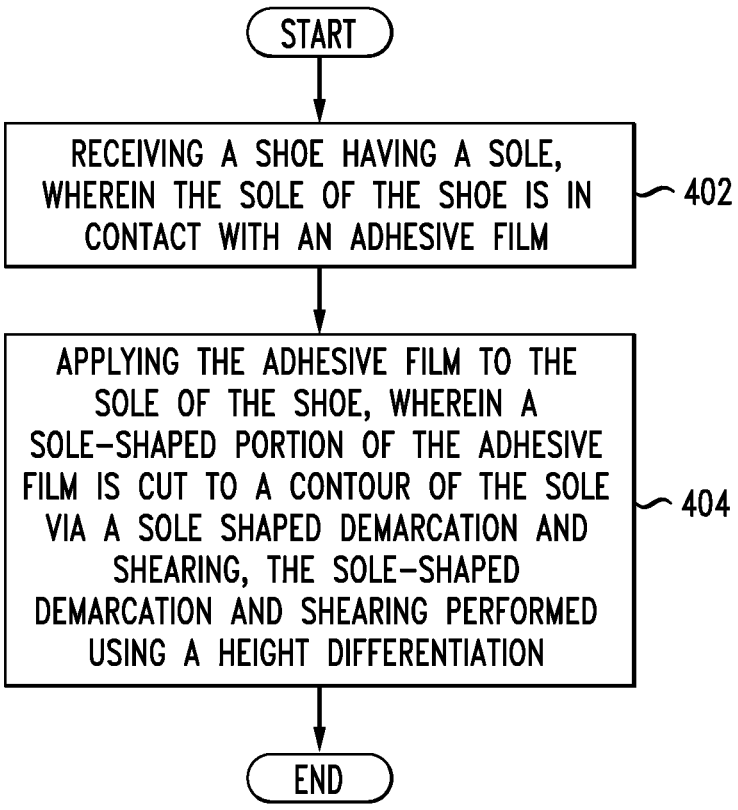
FIG. 4 illustrates a first example method embodiment.

FIG. 4 illustrates a first example method embodiment. For the sake of clarity, the method is described in terms of an exemplary device 200 as shown in FIG. 2 configured to practice the method. The steps outlined herein are exemplary and can be implemented in any combination thereof, including combinations that exclude, add, or modify certain steps. A system 200 configured to practice this method embodiment receives a shoe having a sole, wherein the sole of the shoe is in contact with an adhesive film (402). The adhesive film can be moved into position by the system 200 when the user arrives based on input the system 200 receives or in any other fashion or timing. For example, when the user arrives, the system 200 can detect the user using a motion sensor, an RFID tag, a location-based service associated with a mobile device in the possession of the user, or a microphone which receives a voice command from the user. The system 200 can utilize automatic speech recognition, a graphical user interface, or other interface mechanisms for receiving user input and determining instructions based on the user input. The system 200 can, in response to the input, then spools unused adhesive film into a position ready to receive the shoe. As noted above, the system can also time the movement of the adhesive film to occur after a user has left the device, on a periodic basis, or based on any other data such as triggering data about the weather. For example, the device may spool the adhesive film every hour if no one steps on the doormat to keep the adhesive film fresh and clear of too much dust or debris.

The system 200 then applies the adhesive film to the sole of the shoe, by cutting a sole-shaped portion of the adhesive film via a sole-shaped demarcation and shearing. The sole-shaped demarcation and shearing is achieved using a height differentiation (404) associated with pins. For example, the weight of the user can result in a lowering of the adhesive film portion directly beneath the sole of the shoe from an original height 224A to a lower height 224B, while the remainder portion remains at the original height 224A. The resulting difference in height 224C results in a shearing of the adhesive film in a shape corresponding to the shape of the sole.

The lowering of the adhesive film can be assisted by lowering of a plate and associated pins, which extend through the plate and can be compressed from the original height to the lower height. The pins directly beneath the sole of the shoe will be compressed to the lower height 224B, while those pins which are not directly beneath the sole of the shoe will extend through the lowered plate to remain at the original height 224A. The pins which remain at the original height can retain a remainder portion of the adhesive film, resulting in shearing of the adhesive film.

Alternatively, the height differentiation can be accomplished by raising the pins which are not directly beneath the sole of the shoe to a second height and keeping the pins directly beneath the shoe at the original height. FIG. 3 illustrates a system configured to practice this alternative means for height differentiation. In this example, upon receiving the shoe, the system 300 can raise a plate holding the pins. This raising in turn results in the pins beneath the shoe being compressed between the raising plate and the shoe, while the pins not beneath the shoe are raised, in turn raising the remainder portion of the adhesive film. The resulting height differential between the adhesive film beneath the shoe and the adhesive film raised by the uncompressed pins results in a sole-shaped demarcation, sheared off and adhered to the sole of the shoe.

Figure 5:
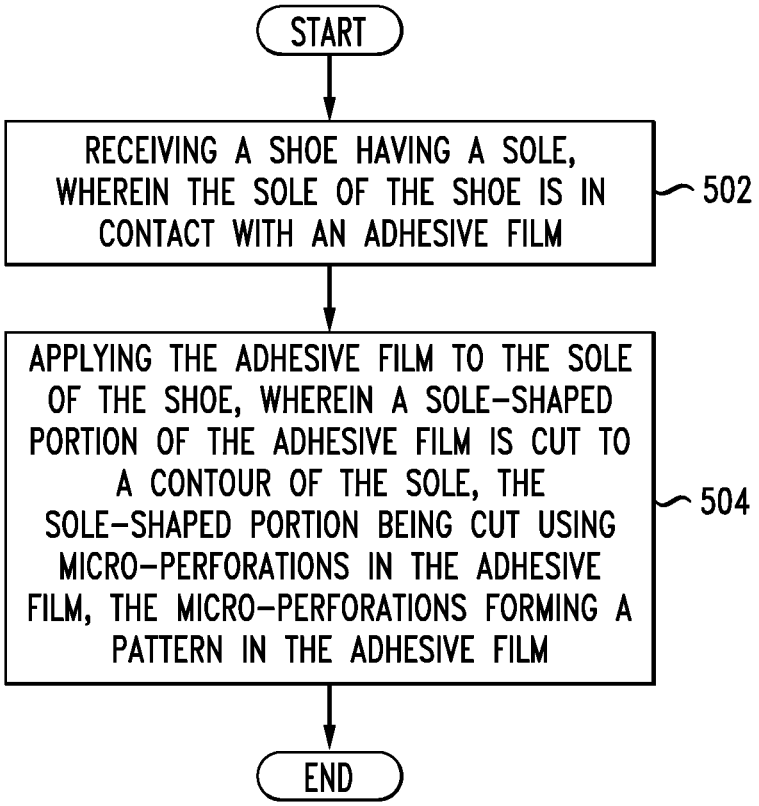
FIG. 5 illustrates a second example method embodiment.

FIG. 5 illustrates a second example method embodiment. For the sake of clarity, the method is described in terms of an exemplary system 200 as shown in FIG. 2 configured to practice the method. The steps outlined herein are exemplary and can be implemented in any combination thereof, including combinations that exclude, add, or modify certain steps. A system 200 configured to perform this method receives a shoe having a sole, wherein the sole of the shoe is in contact with an adhesive film (502). The system 200 then applies the adhesive film to the sole of the shoe, wherein a sole-shaped portion of the adhesive film is cut to a contour of the sole, the sole-shaped portion being cut using micro-perforations in the adhesive film, the micro-perforations forming a pattern in the adhesive film (504). The application of the adhesive film to the sole of the shoe can be performed by pressing pins located beneath the sole of the shoe, and beneath the adhesive film, into the sole. Alternatively, the application of the adhesive film can occur by the shoe pressing against the adhesive film, which in turn is pressed against a plate.

The micro-perforations, or other structure that enables a balance of shearing/tearing forces as described herein, can be uniform or non-uniform throughout the adhesive film. For example, the micro-perforations might be patterned in every increasing sole shapes, starting with micro-perforations in the shape of a small sole and increasing, over multiple iterations, to micro-perforations in the shape of a large sole. As another example, the micro-perforations may be evenly distributed in a uniform pattern throughout the adhesive film, and not in any particular shape. In yet another example, the micro-perforations can be randomly distributed throughout the adhesive film, not following any ordered scheme. In any distribution of the micro-perforations, the distribution of micro-perforations can have minimum threshold distances between the micro-perforations, where the minimum threshold distance between micro-perforations is calculated to allow for tearing or shearing of the adhesive film at a given height differential, or when a given amount of tension is achieved within the adhesive film.

In configurations with or without micro-perforations, the adhesive film can have a balance of physical characteristics where the force required to vertically shear the film is greater than the force to perform lateral tearing. The user, after adhering the film to the sole of the shoes, can walk away with the soles of their shoes covered with adhesive film, thereby preventing tracking of dirt into the house or office. When the user wants to remove the adhesive film from the soles of the shoes, the balance of physical characteristics of the film allows the user to remove the entire sole-shaped piece of adhered film from their shoes in a single pull, rather than having the adhered portion fragment when pulled.

Figure 6:
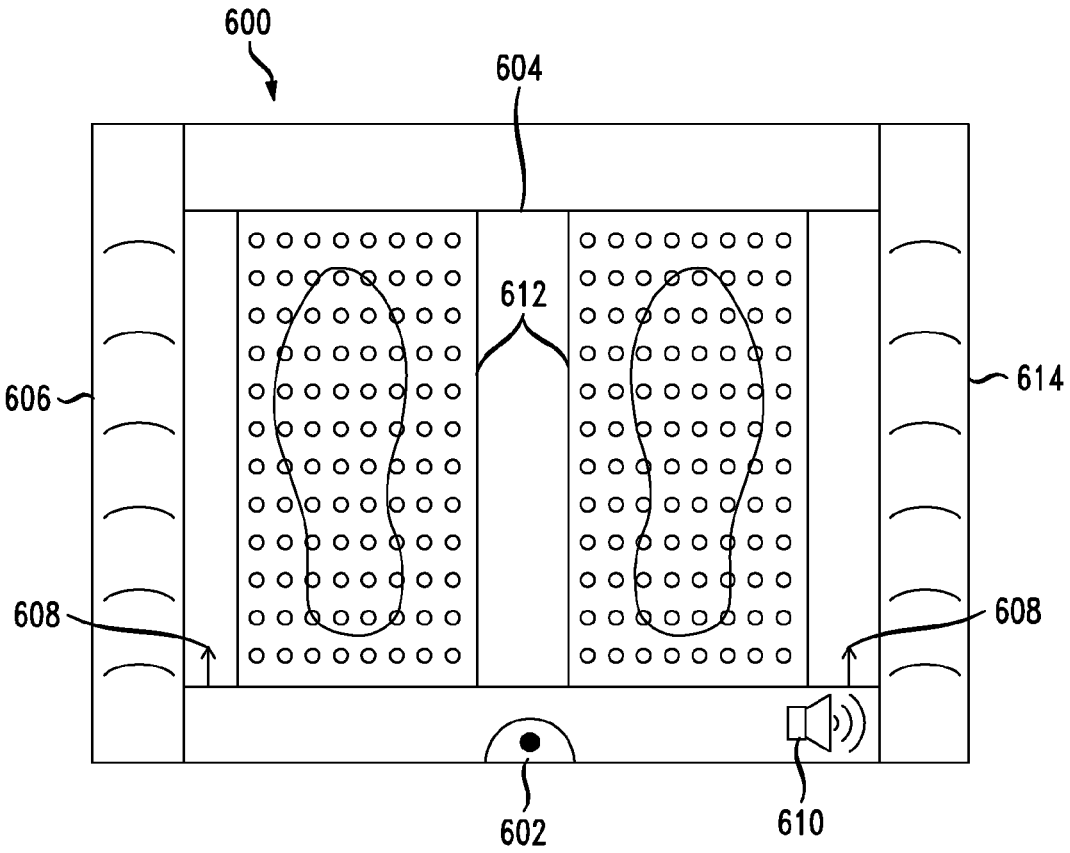
FIG. 6 illustrates a top-down view of a third example device embodiment.

FIG. 6 illustrates a top-down view of a third example device embodiment 600. As illustrated, the device 600 has a sensor 602 to active the device 600. The sensor 602 can be a motion sensor, a radio frequency identification (RFID) sensor, or can be manual sensor/button that the user presses. As an example of a manual button, the sensor can be a button which the user depresses with a foot when approaching the device 600.

Upon receiving a signal or indication that the user is in position from the sensor 602, the device 600 moves, via spooling or other distribution methods, adhesive film 604 from a storage area 606 over a predetermined usage area. The device 600 identifies that the adhesive film 604 is moved into a correct position using positional markers 608. The adhesive film 604 illustrated has two sections 612 having micro-perforations as well as drawings indicating approximate places for shoe placement. When the adhesive film is positioned correctly, the sections 612 will correspond to plates and pins illustrated in FIGS. 2 and 4 (FIG. 2, items 208A and 212; FIG. 4, items 410 and 412), and can represent shoe receiving areas of the device 600. After use, the remainder of the adhesive film 604 can be rolled into a storage bin 614 for later removal.

Certain embodiments can have speakers 610 which output speech and instructions to the user. For example, the device 600, upon recognizing a specific RFID, and while spooling new unused adhesive film into position, can output speech such as, "Welcome back Dr. Smith. Please step forward." If being used at home, the device 600 could state, "Welcome to the Smith home. Please step onto the platform." In addition, the device 600 can be equipped with access to the Internet or other resources which identify reasons for why the device 600 might be needed in any particular instance. For example, the device 600 may determine that it is raining, and state when the motion sensor is triggered, "Due to the rain, please use the provided adhesive shoe protection." As another example, the device 600 may be aware that spills have been detected in a supermarket, and subsequently may produce speech stating, "For your safety, please use the provided adhesive traction for your shoes."

Figure 7:
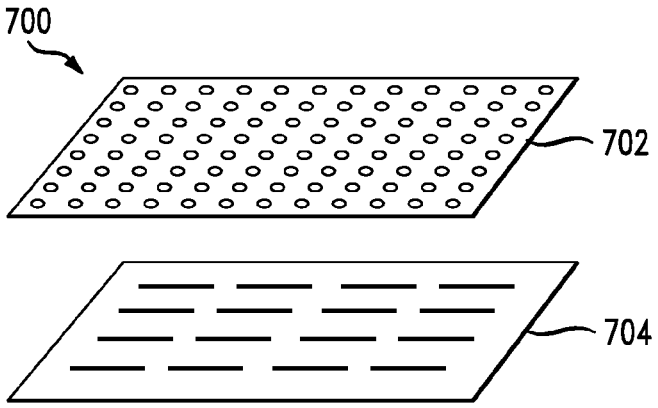
FIG. 7 illustrates an example adhesive film having multiple layers.

FIG. 7 illustrates an example adhesive film 700 having multiple layers 702, 704. As illustrated, the top layer 702 has a uniform pattern of micro-perforations while the bottom layer 704 has a traction contour. The top layer 704 in this instance would be adhesive on both sides, allowing the top side to adhere to the sole of a user's shoe while the bottom side adheres to the traction layer 704. The multi-layered adhesive film 700 can be spooled separately, then connected when the user steps on the top layer, or the multi-layered adhesive film can be combined prior to distribution. In addition, while FIG. 7 illustrates only the top layer being micro-perforated, other embodiments could have micro-perforations in both layers. The fraction of the bottom layer 704 can be created using a contoured material, or can be created using a material having a friction coefficient higher than the shoes.

Embodiments having more than two layers are also considered. For example, an embodiment could have five or six layers within the adhesive film. In addition, these layers may have elements which extend through every layer. For example, in an adhesive film which is also meant to provide ESD (electrostatic discharge) protection, a grounding element can extend from the lowest layer up to the portion which adheres to the shoe, completing the ESD circuit.

In yet other embodiments, the adhesive film can have multiple layers where the top layer, when cut by pins, adheres to the shoe. The bottom layer of the adhesive film remains uncut as a single continuous piece, rather than having a hole corresponding to the removed adhesive portion. As a non-limiting example this is similar to a sticker having a backing. In this case, the "sticker" would be adhesive to the sole of a shoe, leaving a continuous bottom layer of film (i.e., the backing) while the top adhesive layer of film has portions corresponding to the adhered-portions (i.e., the blank area where the sticker used to be located). The continuous bottom layer can have an elastic quality, allowing it to deform/stretch when the height differential exits without tearing. In such an example, the top layer would tear, while the bottom layer stretches and remains continuous. This can be advantageous in collecting the used portions of the adhesive film, as a continuous unused portion is easier to collect than portions having holes. For example, rolling a continuous layer of film can be easier than rolling a layer of film having holes.

Figure 8:
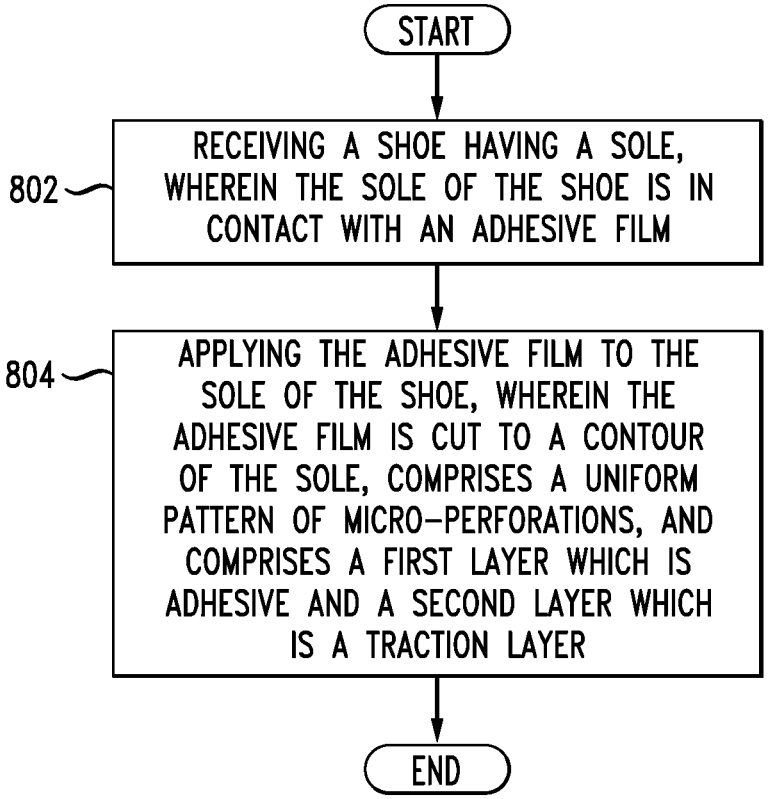
FIG. 8 illustrates a third example method embodiment.

FIG. 8 illustrates a third example method embodiment. For the sake of clarity, the method is described in terms of an exemplary system 200 as shown in FIG. 2 configured to practice the method. The steps outlined herein are exemplary and can be implemented in any combination thereof, including combinations that exclude, add, or modify certain steps. A system 200 configured to perform this method receives a shoe having a sole, wherein the sole of the shoe is in contact with an adhesive film (802). The system 200 then applies the adhesive film to the sole of the shoe, wherein the adhesive film is cut to a contour of the sole, comprises a uniform pattern of micro-perforations, and comprises a first layer which is adhesive and a second layer which is a fraction layer.

The first, adhesive, layer can be proximal to the sole of the shoe, while the second, traction, layer is respectfully distal to the sole. In addition, the adhesive film can be organized into a roll, or alternatively, can be a rolling material. In various configurations, the first layer or the second layer may be exclusively micro-perforated, while the other layer is not micro-perforated. In other embodiments, the two layers can have mismatched patterns of micro-perforations, such that the micro-perforations of the adhesive layer do not align with the micro-perforations of the traction layer.

Figure 9:
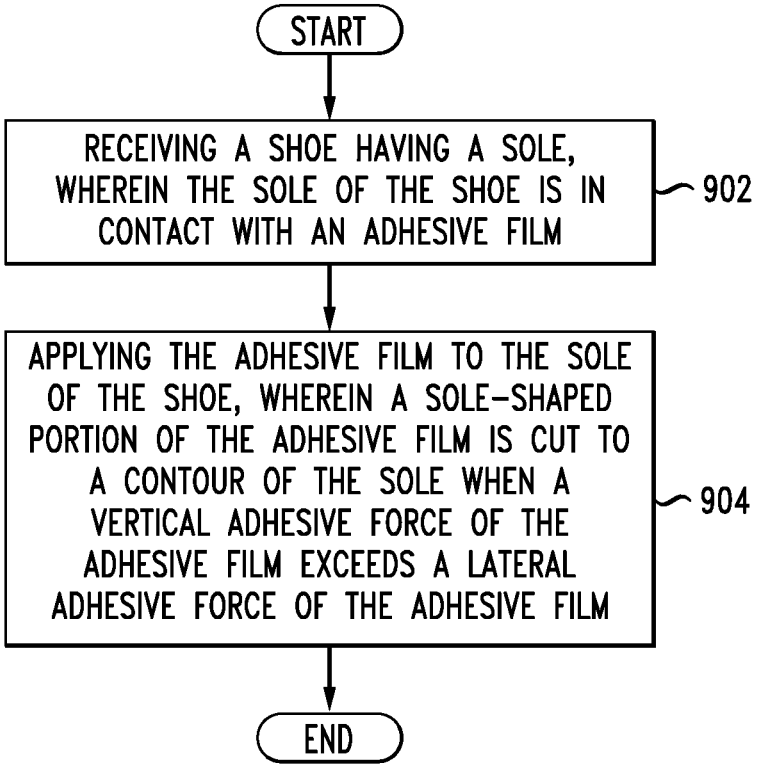
FIG. 9 illustrates a fourth example method embodiment.

FIG. 9 illustrates a [third] *fourth* example method embodiment. For the sake of clarity, the method is described in terms of an exemplary system 200 as shown in FIG. 2 configured to practice the method. The steps outlined herein are exemplary and can be implemented in any combination thereof, including combinations that exclude, add, or modify certain steps. A system 200 configured to perform this method receives a shoe having a sole, wherein the sole of the shoe is in contact with an adhesive film (902). The system 200 then applies the adhesive film to the sole of the shoe, wherein a sole-shaped portion of the adhesive film is cut to a contour of the sole when a vertical adhesive force of the adhesive film exceeds a lateral adhesive force of the adhesive film (904). The cutting which occurs can be due to a height differential, caused by a raising or lowering of the adhesive film. For example, the adhesive film directly beneath the sole can lower upon the system 200 receiving the shoe while the portion of the adhesive film not directly beneath the sole (i.e., the remainder portion) is maintained at the initial height. Alternatively, the remainder portion can be raised while the portion directly beneath the sole remains at the initial height.

The adhesion process occurs by application of force between the sole of the shoe and the adhesive film. In certain instances, the force is from the weight of the shoe pressing down upon the adhesive film, whereas in other instances the force is from pins beneath the sole pressing upward toward the sole. This second example can, for example, occur when a plate lifts pins upward and only some of the pins are directly beneath the sole, resulting in remainder pins not pressing into the sole but instead lifting the remainder of the adhesive film to a height higher than the original height.

Figure 10:
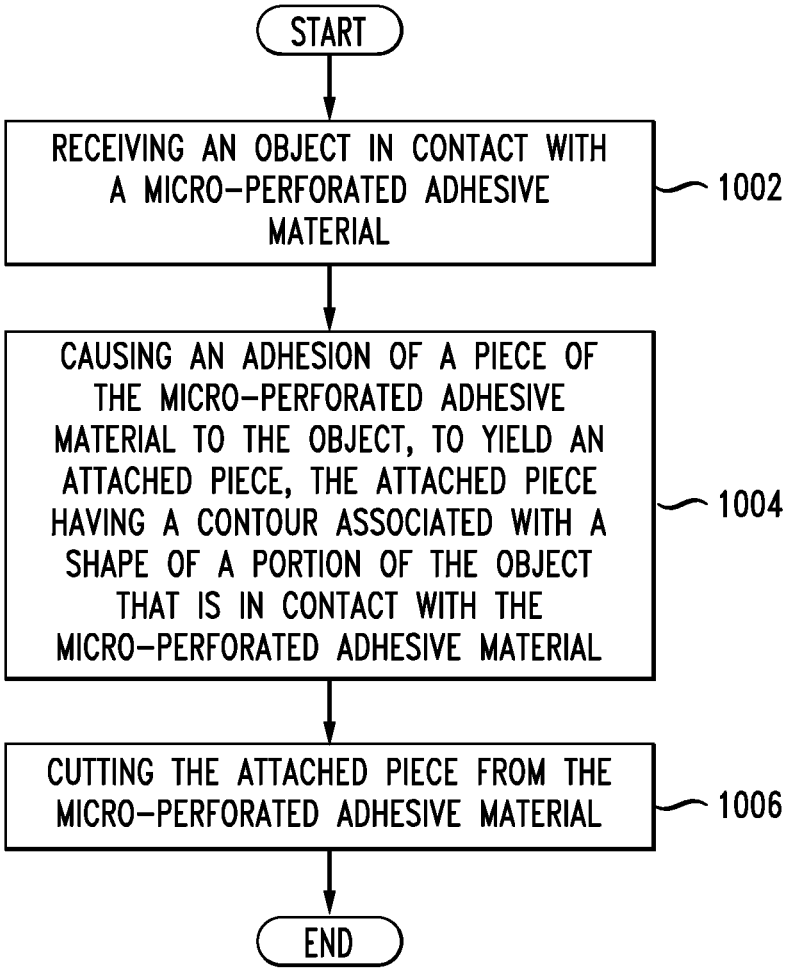
FIG. 10 illustrates a fifth example method embodiment.

FIG. 10 illustrates a [third] *fifth* example method embodiment. For the sake of clarity, the method is described in terms of an exemplary system 200 as shown in FIG. 2 configured to practice the method. The steps outlined herein are exemplary and can be implemented in any combination thereof, including combinations that exclude, add, or modify certain steps. A system 200 configured to perform this method receives an object in contact with a micro-perforated adhesive material (1002). This object can be a shoe, a foot, a sandal, or other form of footwear. Alternatively, the object can be any object for which an adhesive film needs to be applied to a single side. For example, the object could be an individual's hand, a phone, a computer mouse, or a keyboard. The system 200 then causes an adhesion of a piece of the micro-perforated adhesive material to the object, to yield an attached piece, the attached piece having a contour associated with a shape of a portion of the object that is in contact with the micro-perforated adhesive material (1004). The adhesion can occur based on the weight of the object pressing down on the adhesive material, or can occur based on a force from the system 200 against the object. The system then cuts the attached piece from the micro-perforated adhesive material (1006). The cutting can be performed based on a tearing and/or shearing of the adhesive material when the vertical stress exceeds the lateral stress in the adhesive material.

Figure 11A:
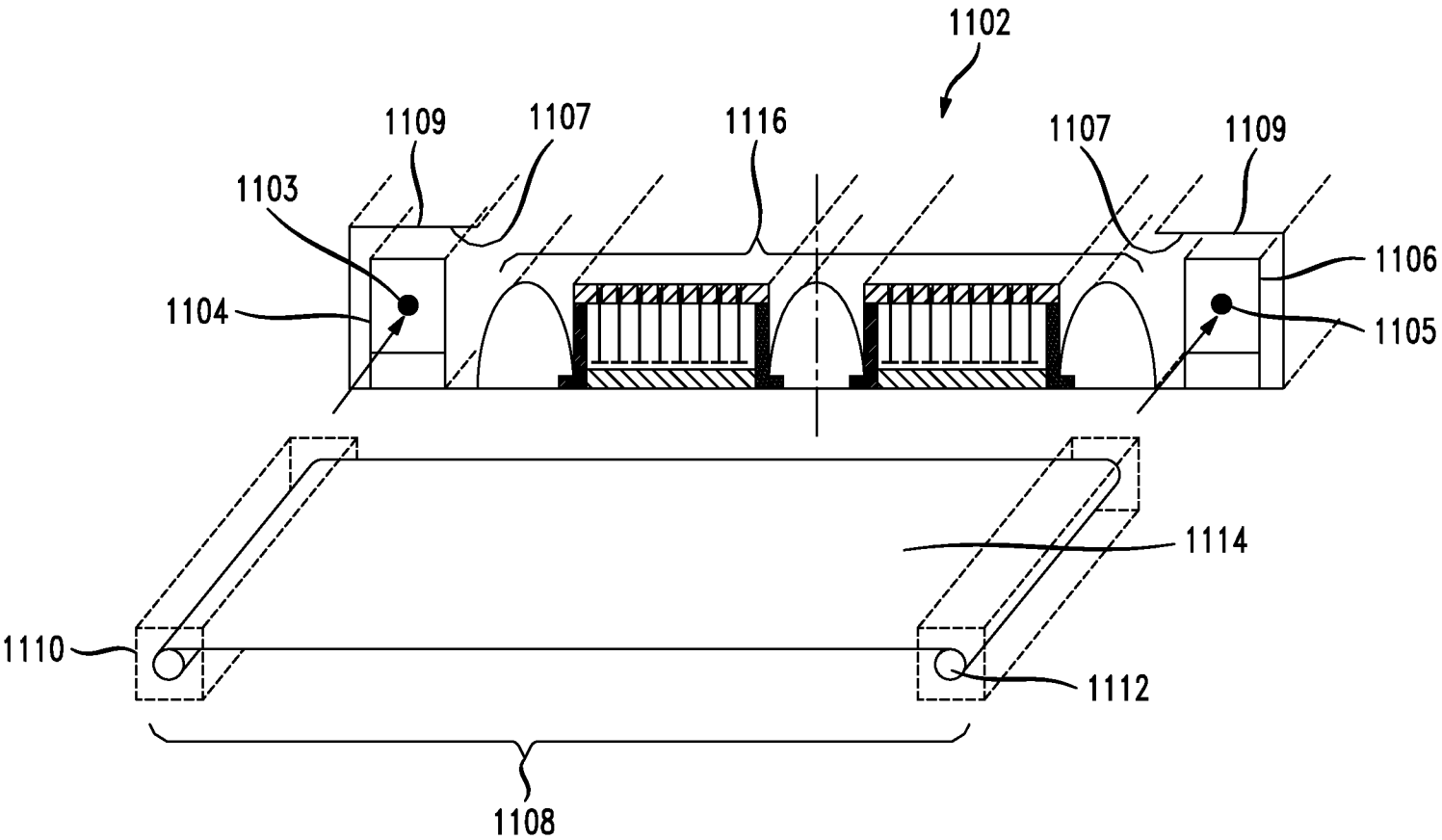
FIGS. 11A-11D illustrate cartridge embodiments.

FIGS. 11A-11D illustrate cartridge embodiments, which can be used to easily replace the adhesive film used in the described embodiments and variations. FIG. 11A illustrates a device 1102 similar to that described in FIG. 2, and an exemplary cartridge 1108. The cartridge system allows the user to remove used adhesive film (i.e., those remainder portions which were not adhered to shoes, then subsequently rolled into a "discard" roll) and refill unused adhesive film by swapping out an adhesive film cartridge 1108. The cartridge 1108 illustrated has two cylinder rolls 1112 with adhesive film 1114 bridged between the rolls 1112. The rolls are housed in square containers 1110 for ease of handling and/or to prevent accidental adhesion when performing replacements. The specific shape of the containers 1110 of adhesive film can vary depending on needs and/or configuration. For example, other containers 1110 can be circular, oval, rectangular, triangular, oval, or any other desirable shape.

The device 1102 as illustrated has cartridge receiving areas 1109 on both the left and right of the device 1102, as well as a shoe receiving area 1116 including material elevators, pins, and plates with holes corresponding to the pins. Within the left and right cartridge receiving areas 1109 are slots 1104, 1106 for holding pieces the square housing containers 1110 of the cartridge 1108 in place when the cartridge 1108 is inserted into the device 1102. These slots 1104, 1106, also have pins or shafts 1103, 1105 corresponding to the cartridge rolls 1112. The shafts 1103 can control the unrolling of the unused adhesive film from the first roll 1112 in the cartridge 1108, and/or can similarly control the rolling of the used adhesive film on the second roll 1112 in the cartridge 1108.

The user, when placing a cartridge 1108 into the device 1102, can line up the left and right portions of the cartridge 1108 with the corresponding cartridge receiving areas 1109 of the device 1102. As the user places the cartridge 1108 into the device 1102, the device can lock the cartridge into place using the pins 1103, 1105 and/or other locking mechanisms. The adhesive film 1114 between the right and left portions of the cartridge 1108 slides over the shoe receiving area 1116. As the device 1102 is used, the unused adhesive film is spooled from a first roller 1112 to the shoe receiving area 1116, users adhere the film to their footwear, and then the used adhesive film is collected on the second roller 1112. Later, when the user needs to replace the cartridge (i.e., the cartridge is empty, or the viability of the adhesive film has expired), the user removes the cartridge 1108 from the device 1102.

Figure 11B:
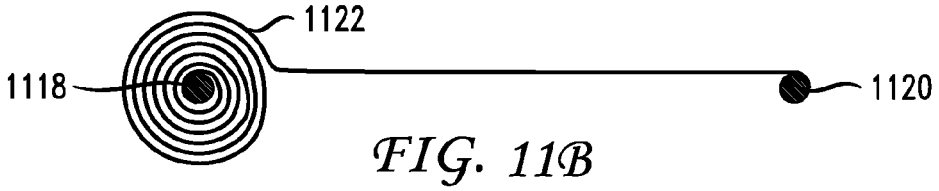

FIG. 11B illustrates a cartridge without additional housing, and is similar to a scroll. A first cylinder 1118 has rolled around it unused adhesive film 1122, which continues on to a second cylinder 1120. Both cylinders 1118, 1120 are inserted into a device together, with the film 1122 over the shoe receiving area. During use used portions of the adhesive film are collected on the second cylinder 1120, resulting in a roll of used adhesive film around in the second cylinder 1120. When replaced, both cylinders are removed.

Figure 11C:
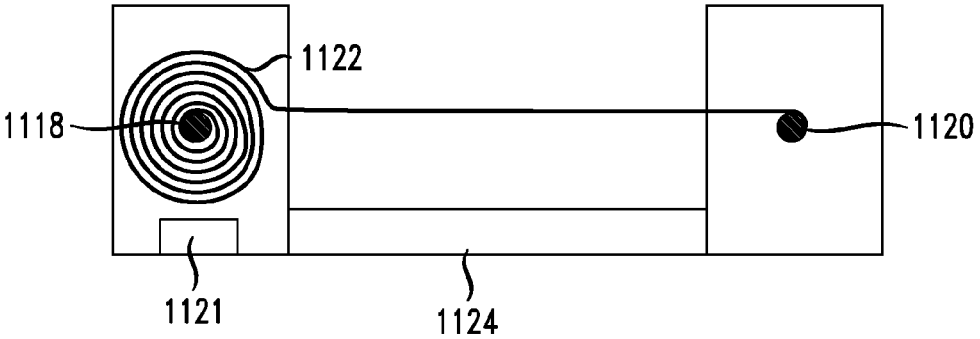
Figure 11D:
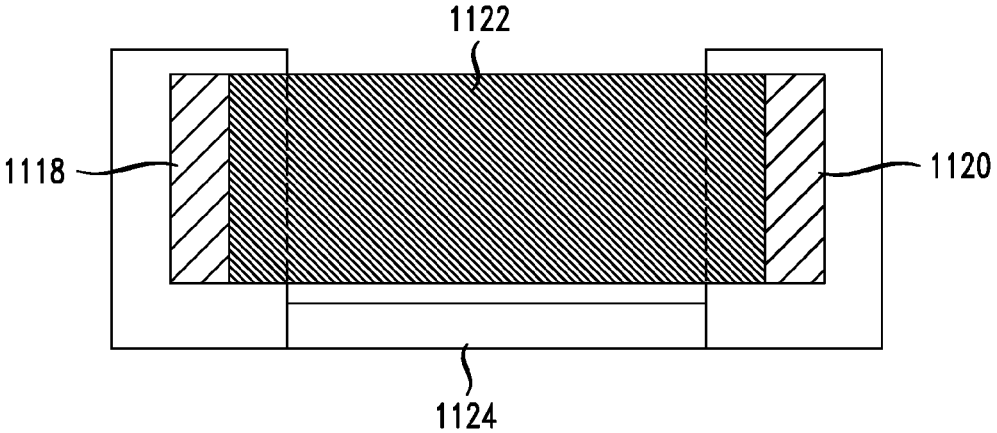

FIG. 11C illustrates the cartridge of FIG. 11B with an additional housing 1124 and a battery pack 1121. The housing 1124 can aid the user in moving and inserting the cartridge. The location of the battery pack 1121 is exemplary, and can be located elsewhere in the cartridge or as a separate item inserted into the device 1102. For example, the battery pack can be built into the housing 1124 or can be located in the spindle of the rollers 1118, 1120. The battery pack 1121 can be used to power the entire device 1102, or can be used to power just the cartridge/distribution of adhesive film. For example, if the battery pack 1121 powers the entire device, the battery pack 1121 can power motion sensors, voice controls, speakers, and/or the distribution of adhesive film. FIG. 11D illustrates the cartridge of FIG. 11C from a top perspective.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to application of adhesive film using devices and systems which can be operate on a purely mechanical basis, can be operated by computing devices, or which are operated using a hybrid of mechanical and computer processing. Various modifications and changes may be made to the principles described herein without following the example embodiments and applications illustrated and described herein, and without departing from the spirit and scope of the disclosure.

We claim:

1. A method comprising:

receiving a footwear having a sole *on a sole receiving demarcation of an adjustable height surface at a first height*, wherein the sole is in contact with an adhesive film; and applying the adhesive film to the sole of the footwear[, wherein a sole-shaped portion of] *by:*

*lowering the adjustable height surface upon receiving the footwear to yield the adjustable height surface to a second height; and* forming the adhesive film [is cut] *in a sole-shaped portion* to [a contour of] the sole via [a sole-shaped demarcation and shearing, the sole-shaped demarcation and shearing performed using] *use of* a height differentiation *between the adjustable height surface at the second height and a surrounding non-adjustable height surface at the first height, wherein the second height is lower than the first height.*

2. The method of claim 1, wherein the *adhesive film is cut into the sole-shaped portion via shearing by the* height differentiation *that* occurs by lowering, from [a] *the* first height to [a] *the* second height, first pins located below the sole-shaped portion due to a weight of the footwear while second pins retain a remainder portion of the adhesive film, the remainder portion comprising the adhesive film without the sole-shaped portion, at the first height.

[3. The method of claim 1, wherein the height differentiation occurs by maintaining first pins located below the sole-shaped portion at a first height while raising second pins located beneath a remainder portion of the adhesive film to a second height, the remainder portion comprising the adhesive film without the sole-shaped portion.]

4. The method of claim 1, wherein the adhesive film comprises a pattern of micro-perforations.

5. The method of claim 4, wherein the pattern of micro-perforations is uniform throughout the adhesive film.

6. The method of claim 4, wherein the pattern of micro-perforations is not uniform throughout the adhesive film.

7. The method of claim 1 further comprising, prior to receiving the footwear, receiving an input indicating that a user is in position to provide the footwear.

8. The method of claim 1, wherein the adhesive film has a balance of physical characteristics which allow removal of the sole-shaped portion of the adhesive film from the sole without fragmenting the sole-shaped portion of the adhesive film.

9. The method of claim 1, further comprising replacing the adhesive film via a disposable cartridge.

10. A system comprising:

a processor;

a footwear receiving area; and a *non-transitory* computer-readable storage medium having instructions stored which, when executed *by the processor*, result in the processor performing operations comprising: upon receiving a footwear having a sole into the footwear receiving area, wherein the sole is in contact with an adhesive film, [applying] *apply* the adhesive film to the sole of the footwear, wherein a sole-shaped portion of the adhesive film is [cut] *shaped* to a contour of the sole via [a sole-shaped demarcation and shearing, the sole-shaped demarcation and shearing performed using] a height differentiation *between an inner height surface beneath the sole of the footwear and a surrounding outer height surface positioned at a height different from a height of the inner height surface after receiving the footwear.*

11. The system of claim 10, wherein the *adhesive film is cut into the sole-shaped portion via shearing by the* height differentiation *that* occurs by lowering, from a first height to a second height, first pins *defining the inner height surface and* located below the sole shaped portion due to a weight of the footwear while second pins *defining the surrounding outer height surface* retain a remainder portion of the adhesive film, the remainder portion comprising the adhesive film without the sole-shaped portion, at the first height.

12. The system of claim 10, wherein the *adhesive film is cut into a sole-shaped portion via shearing by the* height differentiation *that* occurs by maintaining first pins *defining the inner height surface and* located below the sole-shaped portion at a first height while raising second pins *defining the surrounding outer height surface and* located beneath a remainder portion of the adhesive film to a second height, the remainder portion comprising the adhesive film without the sole-shaped portion.

13. The system of claim 10, wherein the adhesive film comprises a pattern of micro-perforations.

14. The system of claim [10] *13*, wherein the pattern of micro-perforations is uniform throughout the adhesive film.

15. The system of claim [10] *13*, wherein the pattern of micro-perforations is not uniform throughout the adhesive film.

16. The system of claim 10, further comprising a user detection sensor.

17. The system of claim 16, wherein the user detection sensor comprises one of a radio frequency detection system, a motion detection system, and a mechanical input button.

[18. The system of claim 16, the computer-readable storage medium further comprising, prior to receiving the footwear, receiving an input from the user detection sensor indicating that a user is in position to provide the footwear.]

19. The system of claim 10, further comprising a removable cartridge system, wherein the removable cartridge system contains the adhesive film.

20. A *non-transitory* computer-readable storage medium having instructions stored which, when executed by a processor *in a device*, cause the [processor] *device* to perform operations comprising:

receiving, *on an adhesive film configured on the device,* a footwear having a sole, wherein the sole is in contact with [an] *the* adhesive film; and

[applying] *forming* the adhesive film *in a sole shape* to the sole of the footwear, wherein [a sole-shaped portion of] the adhesive film is [cut] *formed* to a contour of the sole via [a sole-shaped demarcation and shearing, the sole-shaped demarcation and shearing performed using] a height differentiation *between an inner height surface located beneath the sole of the footwear and an adjacent outer height surface entirely surrounding the inner height surface and positioned at a height different than a height of the inner height surface.*

*21. A method for securing an adhesive film to a sole of a footwear, the method comprising:*

*positioning the adhesive film above an adjustable height surface at a first height;*

*receiving the footwear on the adhesive film above the adjustable height surface;*

*lowering the adjustable height surface to a second height below the first height upon receiving the footwear to yield a lowered adjustable height surface; and*

*forming the adhesive film in a sole shape to the sole of the footwear via a height differentiation between the lowered adjustable height surface and an adjacent non-adjustable height surface entirely surrounding the lowered adjustable height surface and positioned at the first height.*

*22. The method of claim 21, wherein forming the adhesive film in a sole shape further comprises cutting the adhesive film to a contour of the sole of the footwear via a shearing of a sole-shaped demarcation in the adhesive film using the height differentiation.*

*23. The method of claim 22, wherein the adhesive film comprises a pattern of micro-perforations.*

* * * * *